(12) United States Patent
Mitrovic

(10) Patent No.: US 10,319,010 B2
(45) Date of Patent: Jun. 11, 2019

(54) SYSTEMS AND METHODS FOR PERSONALIZED PRICING

(75) Inventor: Ivan Mitrovic, Charlestown, MA (US)

(73) Assignee: eBay Inc., San Jose, CA (US)

(*) Notice: Subject to any disclaimer, the term of this patent is extended or adjusted under 35 U.S.C. 154(b) by 716 days.

(21) Appl. No.: 13/572,433

(22) Filed: Aug. 10, 2012

(65) Prior Publication Data

US 2013/0124360 A1    May 16, 2013

Related U.S. Application Data

(60) Provisional application No. 61/523,133, filed on Aug. 12, 2011.

(51) Int. Cl.
*G06Q 30/00* (2012.01)
*G06Q 30/06* (2012.01)

(52) U.S. Cl.
CPC .................. *G06Q 30/0611* (2013.01)

(58) Field of Classification Search
CPC .................................................. G06Q 30/00
See application file for complete search history.

(56) References Cited

U.S. PATENT DOCUMENTS

| | | | | |
|---|---|---|---|---|
| 4,670,798 A * | 6/1987 | Campbell | ............... | G09F 25/00 340/573.1 |
| 6,598,026 B1 * | 7/2003 | Ojha | .................. | G06Q 30/0633 705/1.1 |
| 7,774,238 B2 * | 8/2010 | Gopalpur | ............. | G06Q 20/203 705/26.81 |
| 7,809,607 B2 * | 10/2010 | Gantman | ........... | G06Q 30/0238 705/14.38 |
| 2002/0010629 A1 * | 1/2002 | Diamond | ............... | G06Q 30/02 705/14.13 |
| 2002/0062254 A1 * | 5/2002 | Matsko | ................. | G06Q 20/201 705/20 |
| 2002/0120516 A1 * | 8/2002 | Sakagami | .............. | G06Q 30/02 705/14.25 |
| 2003/0093314 A1 * | 5/2003 | Leung | .................... | G06Q 30/02 705/14.13 |

(Continued)

FOREIGN PATENT DOCUMENTS

WO      WO-2013025536 A1      2/2013

OTHER PUBLICATIONS

Shinha, Indrajit, "Cost Transparency: The Net's real threat to prices and brands", Marketing, dated Mar. 2000. (Year: 2000).*

(Continued)

*Primary Examiner* — Mark A Fadok
(74) *Attorney, Agent, or Firm* — Schwegman Lundberg & Woessner, P.A.

(57) ABSTRACT

Systems and methods for generating location-based retail pricing options are discussed herein. In an example, a method for generating location-based retail pricing options includes receiving, over a network from a user, a pricing request. The pricing request includes information identifying the user, a merchant, and an intended purchase. In this example, the method further includes determining a pricing option associated with the merchant and the intended purchase, and transmitting the pricing option to the user. The method still further includes processing a purchase transaction, associated with the user, for the intended purchase based on the pricing option.

8 Claims, 10 Drawing Sheets

(56) References Cited

U.S. PATENT DOCUMENTS

| | | | | |
|---|---|---|---|---|
| 2005/0055281 A1* | 3/2005 | Williams | ............... | G06Q 10/00 235/383 |
| 2005/0125292 A1* | 6/2005 | Kassab | ............... | G06Q 30/02 705/14.17 |
| 2005/0245271 A1* | 11/2005 | Vesuna | ............... | G06Q 10/08 455/456.1 |
| 2006/0047847 A1 | 3/2006 | Saccocio | | |
| 2006/0242028 A1* | 10/2006 | Walker | ............... | G06Q 10/087 705/26.4 |
| 2006/0286518 A1* | 12/2006 | Yoder | ............... | G06Q 10/00 434/236 |
| 2007/0136132 A1* | 6/2007 | Weiser | ............... | G06Q 30/02 705/14.64 |
| 2007/0136140 A1 | 6/2007 | Smith, Jr. | | |
| 2007/0192183 A1* | 8/2007 | Monaco | ............... | G06Q 30/02 705/14.25 |
| 2007/0214057 A1 | 9/2007 | Lee et al. | | |
| 2008/0057924 A1* | 3/2008 | Stewart | ............... | G06Q 10/107 455/414.3 |
| 2008/0065509 A1* | 3/2008 | Williams | ............... | G06Q 10/00 705/26.35 |
| 2008/0140479 A1* | 6/2008 | Mello | ............... | G06Q 30/0256 705/14.54 |
| 2008/0154708 A1* | 6/2008 | Allan | ............... | G06Q 30/02 705/1.1 |
| 2008/0228600 A1* | 9/2008 | Treyz | ............... | G06Q 20/12 705/26.43 |
| 2008/0248815 A1* | 10/2008 | Busch | ............... | H04W 4/02 455/456.5 |
| 2008/0249863 A1* | 10/2008 | Redmond | ............... | G06Q 10/10 705/14.27 |
| 2008/0261526 A1* | 10/2008 | Suresh | ............... | G06Q 30/02 455/41.2 |
| 2009/0061884 A1* | 3/2009 | Rajan | ............... | G06Q 30/0225 455/445 |
| 2009/0076912 A1* | 3/2009 | Rajan | ............... | G06Q 30/02 705/14.64 |
| 2009/0157472 A1* | 6/2009 | Burazin | ............... | G06Q 30/02 705/14.57 |
| 2009/0182630 A1* | 7/2009 | Otto | ............... | G06Q 20/20 705/14.1 |
| 2009/0204494 A1* | 8/2009 | Weinblatt | ............... | G06Q 30/02 705/14.1 |
| 2009/0239553 A1* | 9/2009 | Wright | ............... | G06F 17/3087 455/456.3 |
| 2009/0264070 A1* | 10/2009 | Lim | ............... | G06Q 30/0261 455/41.2 |
| 2009/0287558 A1* | 11/2009 | Seth | ............... | G06Q 30/02 705/14.22 |
| 2009/0298481 A1* | 12/2009 | Hurst | ............... | G06Q 30/02 455/414.1 |
| 2010/0030578 A1* | 2/2010 | Siddique | ............... | G06Q 10/0637 705/3 |
| 2010/0063893 A1* | 3/2010 | Townsend | ............... | G06Q 20/12 705/26.1 |
| 2010/0106703 A1* | 4/2010 | Cramer | ............... | G06F 17/30867 707/706 |
| 2010/0169336 A1* | 7/2010 | Eckhoff-Hornback | ............... | G06Q 10/087 707/758 |
| 2010/0240399 A1* | 9/2010 | Roumeliotis | ............... | G06Q 30/0261 455/456.3 |
| 2010/0306080 A1 | 12/2010 | Trandal et al. | | |
| 2011/0029362 A1* | 2/2011 | Roeding | ............... | G06Q 30/00 705/14.13 |
| 2011/0093326 A1* | 4/2011 | Bous | ............... | G06Q 30/02 705/14.38 |
| 2011/0165888 A1* | 7/2011 | Shuman | ............... | G06F 17/30041 455/456.1 |
| 2011/0191173 A1 | 8/2011 | Blackhurst et al. | | |
| 2012/0072274 A1* | 3/2012 | King | ............... | G06Q 30/0214 705/14.16 |
| 2013/0006794 A1* | 1/2013 | Horvitz | ............... | G06Q 30/08 705/26.2 |

OTHER PUBLICATIONS

"International Application Serial No. PCT/US2012/050410, International Preliminary Report on Patentability dated Feb. 27, 2014", 7 pgs.

"International Application Serial No. PCT/US2012/050410, Search Report dated Nov. 5, 2012", 2 pgs.

"International Application Serial No. PCT/US2012/050410, Written Opinion dated Nov. 5, 2012", 5 pgs.

\* cited by examiner

SYSTEMS AND METHODS FOR PERSONALIZED PRICING

RELATED APPLICATIONS

This patent application claims the benefit of U.S. Provisional Patent Application Ser. No. 61/523,133 filed Aug. 12, 2011 and entitled "SYSTEMS AND METHODS FOR PERSONALIZED PRICING", the contents of which are incorporated by reference herein in their entirety.

TECHNICAL FIELD

This application relates generally to data processing within a network based system operating over a distributed network, and more specifically to systems and methods providing an infrastructure to support localized personalized pricing.

BACKGROUND

Pricing of goods and services is an inherently difficult task made even more challenging by the vastly improved availability of pricing data provided by the Internet and mobile applications. Today, users of a smartphone, such as the iPhone® cellular phone from Apple, Inc. of Cupertino, Calif.) can comparison shop across a wide variety of outlets at the touch of a button or merely by scanning a bar code. The near instantaneous availability of comparison pricing data is putting pressure on retailers to react more quickly to pricing changes in both the local and national market. Unfortunately, legacy retail systems are difficult to adapt quickly to changing pricing, which requires retailers to rely heavily on manual price matching and other labor intensive pricing mechanisms. Additionally, it is difficult to train retail workers to deal with the rapid changes caused by the ready availability of pricing data.

BRIEF DESCRIPTION OF THE DRAWINGS

Some embodiments are illustrated by way of example and not limitation in the figures of the accompanying drawings in which.

DETAILED DESCRIPTION

Figure 1:
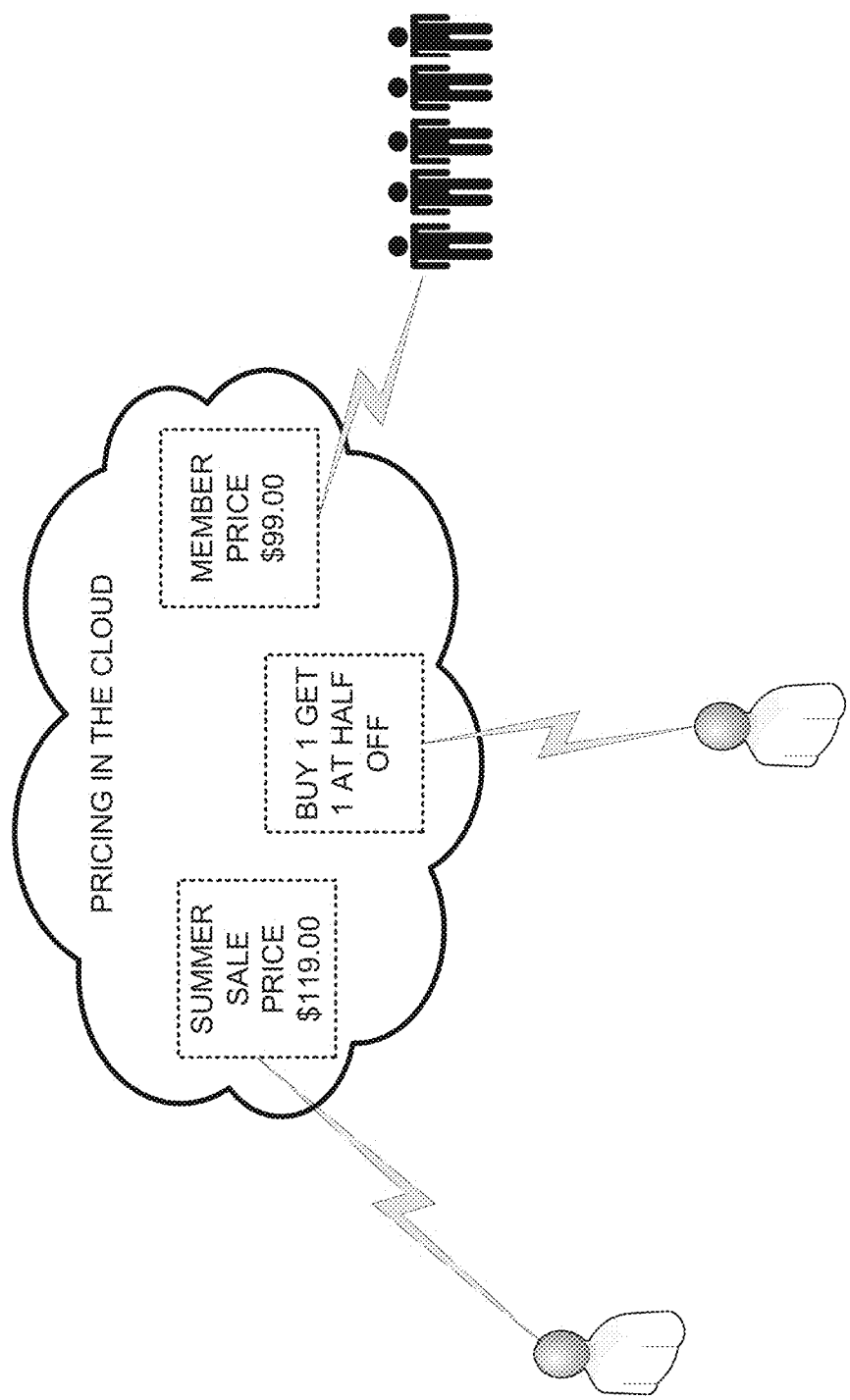
FIG. 1 is a block diagram depicting multiple pricing options, according to an example embodiment.

Example systems and methods for providing personalized pricing are described. The systems and methods for providing real-time context-aware personalized pricing, in some example embodiments may provide pricing options based on past behavior and current context of a user interacting with retail locations utilizing a network-based personalized pricing system. In the following description, for purposes of explanation, numerous specific details are set forth in order to provide a thorough understanding of example embodiments. It will be evident, however, to one skilled in the art that the present invention may be practiced without these specific details. It will also be evident, that the real-time context-aware personalized pricing system is not limited to the examples provided and may include other scenarios not specifically discussed.

In accordance with an example embodiment, a network-based system can provide personalized pricing based on a user's current location. The network-based system can leverage past user interactions with the network-based system. In some examples, the user interacts with the network-based system via a mobile device, such as a smartphone, a tablet computing device, or Internet-enabled personal digital assistant (PDA), among others. In an example, the network-based system can include a local personalized pricing module capable of deriving context-aware personalized pricing options and communicating the pricing options to both a user's mobile device and the retail location's point of sale (POS) system in near real-time. The network-based system can provide a "price in the cloud" pricing mechanism, which can provide location-based dynamic pricing to users at a point of sale. The network-based system can provide location-based dynamic pricing to individual users without requiring that the point of sale system be updated or that retail staff be trained on pricing schemes or coupon redemption. In an example, pricing schemes can be outsourced to an external vendor (e.g., a virtual pricing service) that is decoupled from a point of sale system. Decoupling the pricing mechanism from the point of sale system can allow a pricing service vendor (or a merchant) to create dynamic and creative pricing schemes. The pricing schemes can be location-based such that they can be applied to a particular store, and the pricing schemes may allow for a personal price to be displayed to each user on a mobile device upon checkout. In an example, dynamic personalized pricing can be achieved by avoiding an immediate settlement upon checkout, and instead redirecting a checkout to a system that applies dynamic personalized pricing and handles transaction processing. The dynamic personalized pricing and transaction processing may include payment processing (e.g., reconciles with the merchant and the buyer).

Traditional pricing is expensive; at least one study shows that up to 1.93% of the Unites States gross domestic product (GDP) is spent in setting and re-setting retail prices. One reason that pricing is expensive is that different pricing models appeal to different consumers. As an illustrative example, private sales may be appealing to some groups of consumers, whereas subscriptions, automatic markdowns, and group discounts may be appealing to a different group of consumers.

POS and backend retail systems can also make pricing innovation difficult and expensive. Merchants need a system that allows for pricing innovation without requiring extensive system reprogramming or employee training.

Due at least in part to the challenges discussed above, innovative pricing strategies are rare. In 1908, Edward Filene came up with the idea of selling overstock, surplus, and closeout merchandise. Filene's system revolved around an applying an automatic markdown to merchandise every two weeks. Every 14 days after a product was introduced to the sales floor, it was automatically marked down by 25% until it is sold. When Filene's system was first introduced, 90% of items were sold on the first day the product was introduced to the sales floor.

Recently, social deal or coupon web sites, such as Groupon.com (from Groupon, Inc. of Chicago, Ill.), have become a popular means for customers to receive deals and for merchants to promote goods and services. However, couponing or group deals are merely a proxy to real pricing innovation.

In contrast, moving the pricing function from a location-specific (e.g., price tag) model to a virtual (e.g., "price in the cloud") model can allow merchants to innovate more freely on price. Virtual pricing can enable dynamic pricing based on consumer segment, and virtual pricing can also increase profitability.

FIG. 1 is a block diagram depicting a virtual pricing system, according to an example embodiment. FIG. 1 depicts three different pricing models that can be applied simultaneously to the same product depending on which of three different people or groups are making a purchase. Moving the price setting and transaction processing functions into a virtual space allows for greater flexibility and pricing innovation utilizing personalized, contextual pricing. A virtual pricing system according to at least one example embodiment may allow for flexible pricing strategies including, for example, name-your-price pricing in which a consumer bids on a price, or demand-based pricing in which the price changes based on the number of consumers buying the product. Still further, the virtual pricing system of an embodiment may allow a consumer to build modules on-the-fly, for example when assembling features or components of a home computer. Additionally, a virtual pricing system can mix and match different pricing schemes for individual users and individual locations. However, it will be understood that these are non-limiting examples and other uses may be found or contemplated for the virtual pricing system of example embodiments.

Example System

Figure 2:
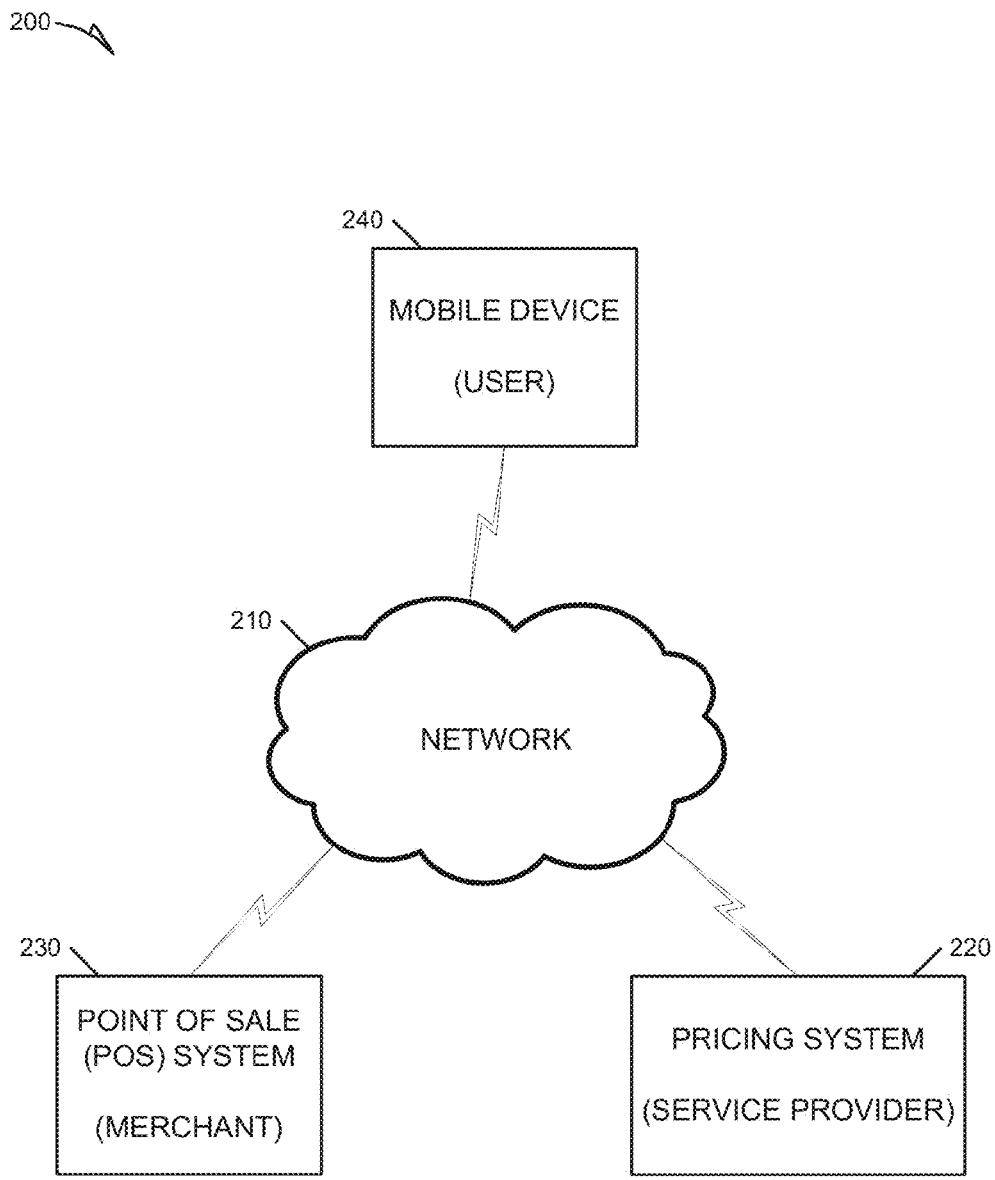
FIG. 2 is a block diagram illustrating a dynamic personalized pricing system, according to an example embodiment.

FIG. 2 is a block diagram illustrating a dynamic personalized pricing system 200 in which example embodiments are implemented. The system 200 can include a network 210, a pricing system 220, a POS system 230, and a mobile device 240. In an example embodiment, the pricing system represents a service provider, the POS system 230 represents a merchant, and the mobile device 240 represents a user.

In at least one example embodiment, a user via mobile device 240 can interact with the pricing system 220 over the network 210 while the user is shopping with the merchant. In example embodiments, the mobile device 240 can further interact (e.g., communicate) with the POS system 230 over the network 210. In an example, the pricing system 220 can provide, in real-time, pricing options over the network 210 to the mobile device 240 based on input received from the mobile device 240.

The merchant can communicate with the pricing system 220 via the POS system 230 (or a similar system) to configure pricing options (e.g., pricing structures, such as Buy 1, Get 1 half off) that the merchant wishes to make available to users. The pricing system 220 can be configured with rule-based pricing options that can be applied in real-time based on inputs received from the mobile device 240 and the POS system 230. In certain examples, the pricing system 220 can access (or maintain) user profile data including, for example, past purchase history, club membership information, or demographic data associated with the user. The user profile data can be evaluated against the pricing option rules to determine what pricing options should be provided to a particular user that is considering purchase of a particular product or service from a particular merchant. For example, the merchant could configure a pricing option that requires the user to be a member of the merchant's frequent buyer club to receive a 25% discount on a particular item. The pricing system 220 can then communicate or cooperate with the POS system 230 to reconcile the transaction based on the pricing option chosen by the user. Additional details regarding the interactions between the pricing system 220, the POS system 230, and the mobile device 240 are discussed below with reference to FIG. 7 and FIG. 8.

Example Operating Environment

Figure 3:
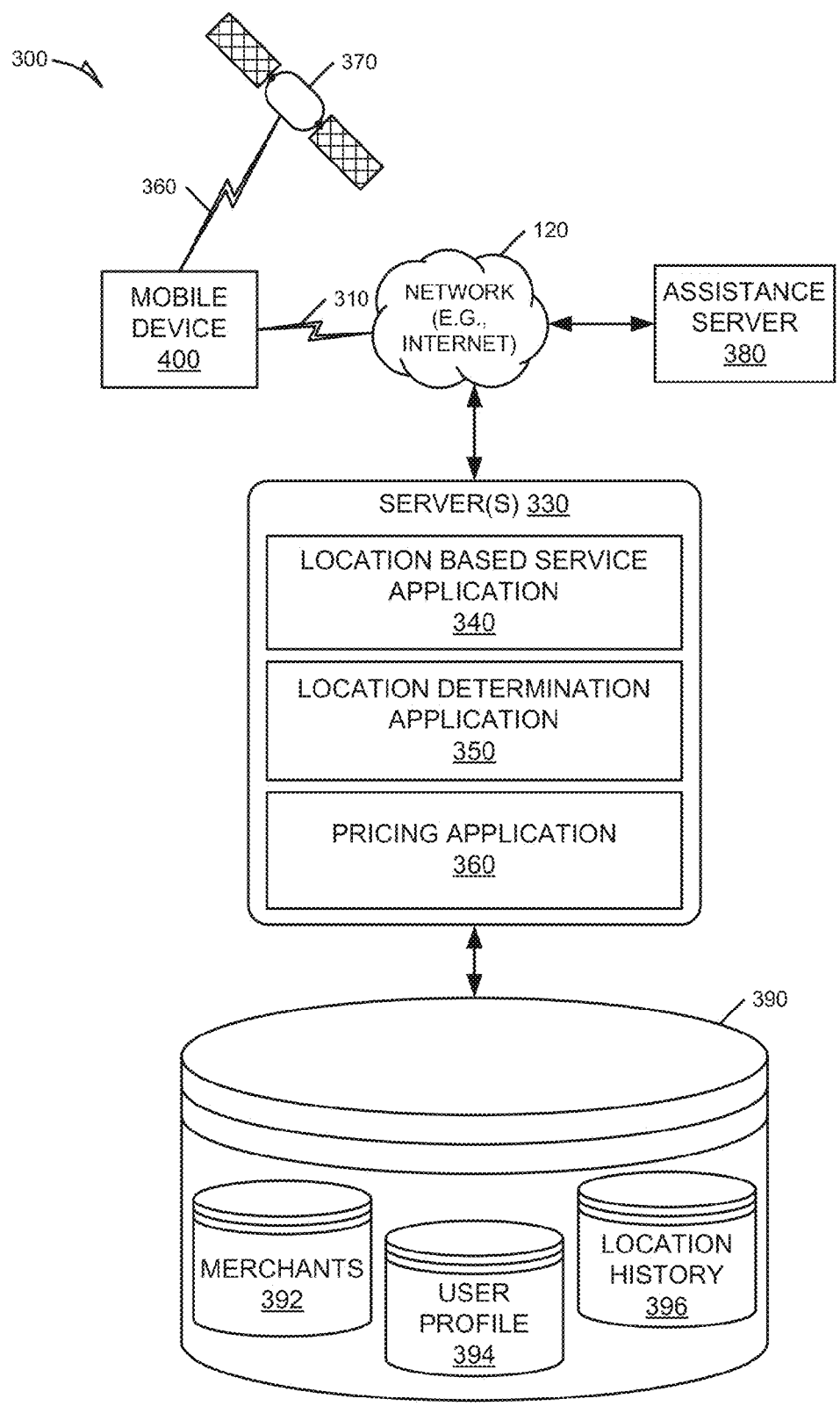
FIG. 3 is a block diagram illustrating an environment for operating a mobile device, according to an example embodiment.

FIG. 3 is a block diagram illustrating an environment 300 for operating a mobile device 400, according to an example embodiment. The mobile electronic device 400 may be any of a variety of types of devices, for example a cellular telephone, a personal digital assistant (PDA), a Personal Navigation Device (PND), a handheld computer, a tablet computer, a notebook computer, or other type of movable device. The device 400 may interface via a connection 310 with a communication network 320. Depending on the form of the mobile electronic device 400, any of a variety of types of connections 310 and communication networks 320 may be used.

For example, the connection 310 may be Code Division Multiple Access (CDMA) connection, a Global System for Mobile communications (GSM) connection, or other type of cellular connection. Such connection 310 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the communication network 320 may include a cellular network that has a plurality of cell sites of overlapping geographic coverage, interconnected by cellular telephone exchanges. These cellular telephone exchanges may be coupled to a network backbone, for example, the public switched telephone network (PSTN), packet-switched data network, or to other types of networks.

In another example, the connection 310 may be a Wireless Fidelity (Wi-Fi, IEEE 802.11x type) connection, a Worldwide Interoperability for Microwave Access (WiMAX) connection, or another type of wireless data connection. In such an embodiment, the communication network 320 may include one or more wireless access points coupled to a local area network (LAN), a wide area network (WAN), the Internet, or other packet-switched data network.

In yet another example, the connection 310 may be a wired connection, for example an Ethernet link, and the communication network may be a local area network (LAN), a wide area network (WAN), the Internet, or other packet-switched data network. Accordingly, a variety of different configurations are expressly contemplated.

A plurality of servers 330 may be coupled via interfaces to the communication network 320, for example, via wired or wireless interfaces. These servers 330 may be configured to provide various types of services to the mobile electronic device 400. For example, one or more servers 330 may execute location based service (LBS) applications 340, which interoperate with software executing on the device 400, to provide LBS's to a user. LBS's can use knowledge of the device's location, and/or the location of other devices, to provide location-specific information, recommendations, notifications, interactive capabilities, and/or other functionality to a user. Knowledge of the device's location, and/or the location of other devices, may be obtained through interoperation of the device 400 with a location determination application 350 executing on one or more of the servers 330. Location information may also be provided by the mobile device 400, without use of a location determination application such as location determination application 350.

In example embodiments, the mobile device 400 may have location determination capabilities. These location determination capabilities of the mobile device 400 may be augmented by the location determination application 350. In example embodiments, the servers 330 can also include pricing application 360 for providing location-based personalized pricing options. In certain examples, location data can be provided to the pricing application 360 by the location determination application 350. In some examples, the location data provided by the location determination application 350 can include merchant information (e.g., identification of a retail location).

Example Mobile Device

Figure 4:
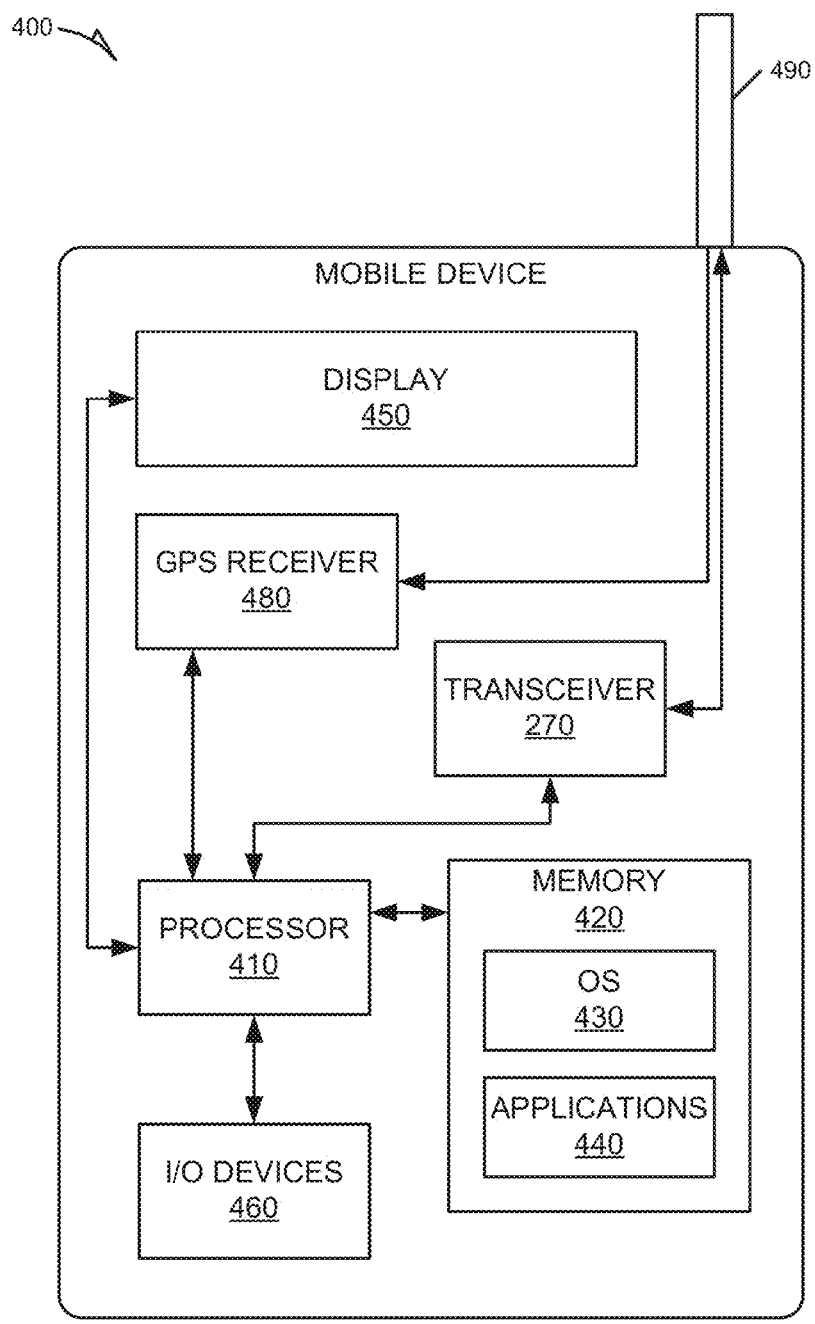
FIG. 4 is a block diagram illustrating a mobile device, according to an example embodiment.

FIG. 4 is a block diagram illustrating the mobile device 400, according to an example embodiment. The device 400 may include a processor 410. The processor 410 may be any of a variety of different types of commercially available processors suitable for mobile devices, for example, an XScale architecture microprocessor, a Microprocessor without Interlocked Pipeline Stages (MIPS) architecture processor, or another type of processor. A memory 420, such as a Random Access Memory (RAM), a Flash memory, or other type of memory, is typically accessible to the processor. The memory 120 may be adapted to store an operating system (OS) 430, as well as application programs 440, such as a mobile location enabled application that may provide LBS's to a user.

The processor 410 may be coupled, either directly or via appropriate intermediary hardware, to a display 450 and to one or more input/output (I/O) devices 460, such as a keypad, a touch panel sensor, a microphone, etc. Similarly, in some embodiments, the processor 410 may be coupled to a transceiver 470 that interfaces with an antenna 490. The transceiver 470 may be configured to both transmit and receive cellular network signals, wireless data signals, or other types of signals via the antenna 490, depending on the nature of the device 400. In this manner the connection 410 with the communication network 420 may be established. Further, in some configurations, a GPS receiver 480 may also make use of the antenna 490 to receive GPS signals.

Additional detail regarding providing and receiving location-based services can be found in U.S. Pat. No. 7,848,765, Titled "Location-Based Services," granted to Phillips et al. and assigned to Where, Inc. of Boston, Mass., which is hereby incorporated by reference.

Example Platform Architecture

Figure 5:
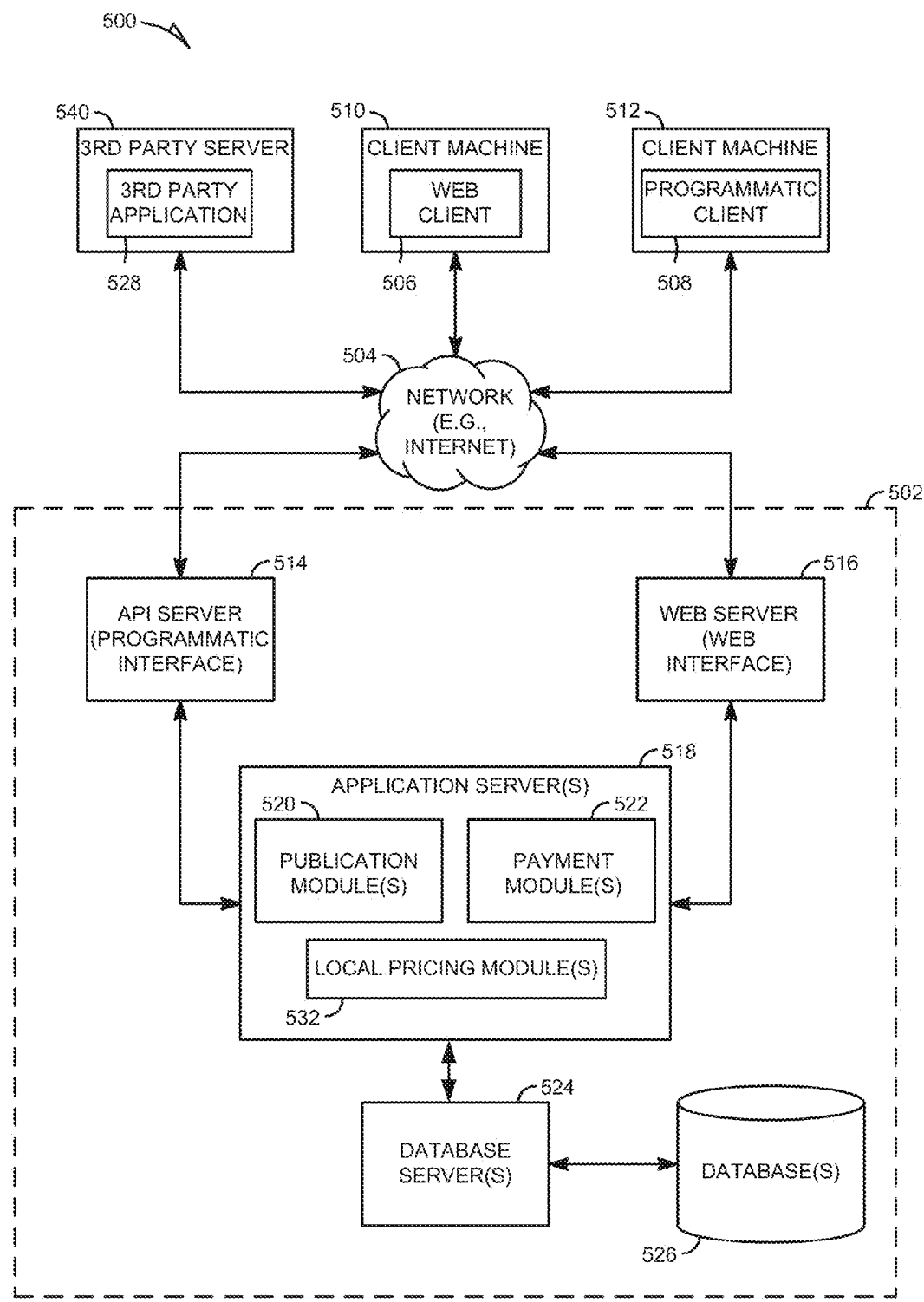
FIG. 5 is a block diagram illustrating a network-based system for providing dynamic personalized contextual pricing, according to an example embodiment.

FIG. 5 is a block diagram illustrating a network-based system 500 for providing dynamic personalized contextual pricing, according to an example embodiment. The block diagram depicting a client-server system 500, within which an example embodiment can be deployed, is described. A networked system 502, in the example forms of a network-based location-aware pricing, advertisement, or publication system, provides server-side functionality via a network 504 (e.g., the Internet or Wide Area Network (WAN)) to one or more clients 510, 512. FIG. 5 illustrates, for example, a web client 506 (e.g., a browser, such as the Internet Explorer browser developed by Microsoft Corporation of Redmond, Wash. State), and a programmatic client 508 (e.g., a WHERE smartphone application from Where, Inc. of Boston, Mass.) executing on respective client machines 510 and 512. In an example, the client machines 510 and 512 can be in the form of a mobile device, such as mobile device 400.

An Application Programming Interface (API) server 514 and a web server 516 are coupled to, and provide programmatic and web interfaces respectively to, one or more application servers 518. The application servers 518 host one or more publication modules 520. The publication modules 520 may include, for example, commerce modules, advertising modules, payment modules 522, local pricing modules 532, and marketplace modules. However, it will be understood that example embodiments are not limited thereto. The application servers 518 are, in turn, shown to be coupled to one or more database servers 524 that facilitate access to one or more databases 526. In some examples, the application server 518 can access the databases 526 directly without the need for a database server 524.

The publication modules 520 may provide a number of publication functions and services to users that access the networked system 502. The payment modules 522 may likewise provide a number of payment services and functions to users. The payment modules 522 may allow users to accumulate value (e.g., in a commercial currency, such as the U.S. dollar, or a proprietary currency, such as "points") in accounts, and then later to redeem the accumulated value for products (e.g., goods or services) that are advertised or made available via the various publication modules 520, within retail locations, or within external online retail venues.

The payment modules 522 may also be configured to present pricing options, generated by the local pricing modules 532, to a user during checkout (or prior to checkout, while the user is still actively shopping). The local pricing modules 532 may provide real-time location-aware personalized pricing options to users of the networked system 502. The local pricing modules 532 can be configured to use all of the various communication mechanisms provided by the networked system 502 to present pricing options to users. The pricing options can be personalized based on current location, time of day, user profile data, past purchase history, or recent physical or online behaviors recorded by the network-based system 500, among other things.

While the publication modules 520, payment modules 522, and local pricing modules 532 are shown in FIG. 5 to all form part of the networked system 502, it will be appreciated that, in alternative embodiments, the payment modules 522 may form part of a payment service that is separate and distinct from the networked system 502. Additionally, in some examples, the local pricing modules 532 may be part of the payment service or may form a pricing service separate and distinct from the networked system 502.

Further, while the system 500 shown in FIG. 5 employs a client-server architecture, it will be understood that embodiments are not limited to such an architecture. On the contrary, example embodiments could be implemented in a distributed, or peer-to-peer, architecture system, for example. The various publication modules 520, payment modules 522, and local pricing modules 532 could also be implemented as standalone systems or software programs, which do not necessarily have networking capabilities.

The web client 506 accesses the various publication modules 520, payment modules 522, and local pricing modules 532 via the web interface supported by the web server 516. Similarly, the programmatic client 508 accesses the various services and functions provided by the publication modules 520, payment modules 522, and local pricing modules 532 via the programmatic interface provided by the API server 514. The programmatic client 508 may, for example, be a smartphone application (e.g., the WHERE application developed by Where, Inc., of Boston, Mass.) to enable users to receive real-time location-aware personalized pricing options on their smartphones leveraging user profile data and current location information provided by the smartphone or accessed over the network 504.

FIG. 5 also illustrates a third party application 528, executing on a third party server machine 530, as having programmatic access to the networked system 502 via the programmatic interface provided by the API server 514. For example, the third party application 528 may, utilizing information retrieved from the networked system 502, support one or more features or functions on a website hosted by the third party. The third party website may, tier example, provide one or more promotional, marketplace or payment functions that are supported by the relevant applications of the networked system 502. Additionally, the third party website may provide merchants with access to the local pricing modules 532 for configuration purposes. In certain examples, merchants can use programmatic interfaces provided by the API server 514 to develop and implement rules-based pricing schemes that can be implemented via the publication modules 520, payment modules 522, and local pricing modules 532.

Example Pricing Modules

Figure 6:
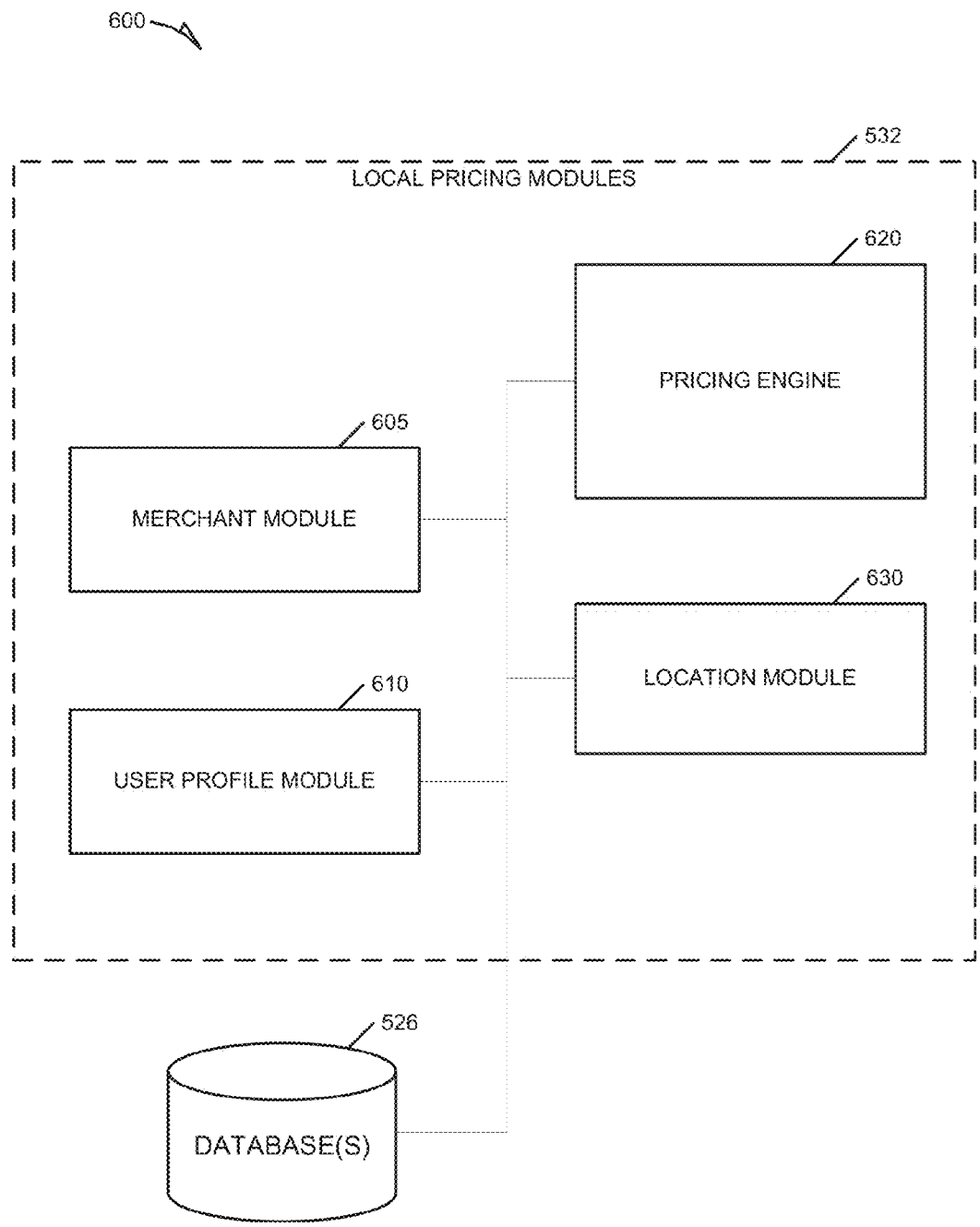
FIG. 6 is a block diagram illustrating pricing modules, according to an example embodiment.

FIG. 6 is a block diagram illustrating pricing modules 532, according to an example embodiment. In this example, the local pricing modules 532 can include a merchant module 605, a user profile module 610, a location module 630, and a pricing engine 620. In this example, the local pricing modules 532 can access database 526 to store and/or retrieve pricing options, user profile data, and other information to enable location-aware personalized pricing.

In an example, merchants can access the local pricing modules 532 via the merchant module 605. The merchant module 605 can provide tools that allow individual merchants, national retailers, and online retailers to develop and implement customized pricing schemes. The pricing schemes can be individualized at the user level and the pricing schemes are implemented through rules-based pricing options. Via the merchant module 605, a merchant can configure one or more rules-based pricing options to be implemented via the pricing engine 620. In an example, the rules-based pricing options are stored in database 526.

In an example, the user profile module 610 can provide user profile data to the pricing engine 620 when the pricing engine 620 requires user profile data to evaluate available pricing options. The user profile module 610 can access user profile data stored within a database, such as database 526, or the user profile module 610 can access user profile data received from a mobile device, such as mobile device 400. The location module 630 can provide location data to the pricing engine 620 for use in evaluation of available pricing options. In certain examples, the location module 630 can determine a physical location associated with an individual use and the location module 630 can also associate the physical location with a known merchant location for use by the pricing engine 620.

Figure 7:
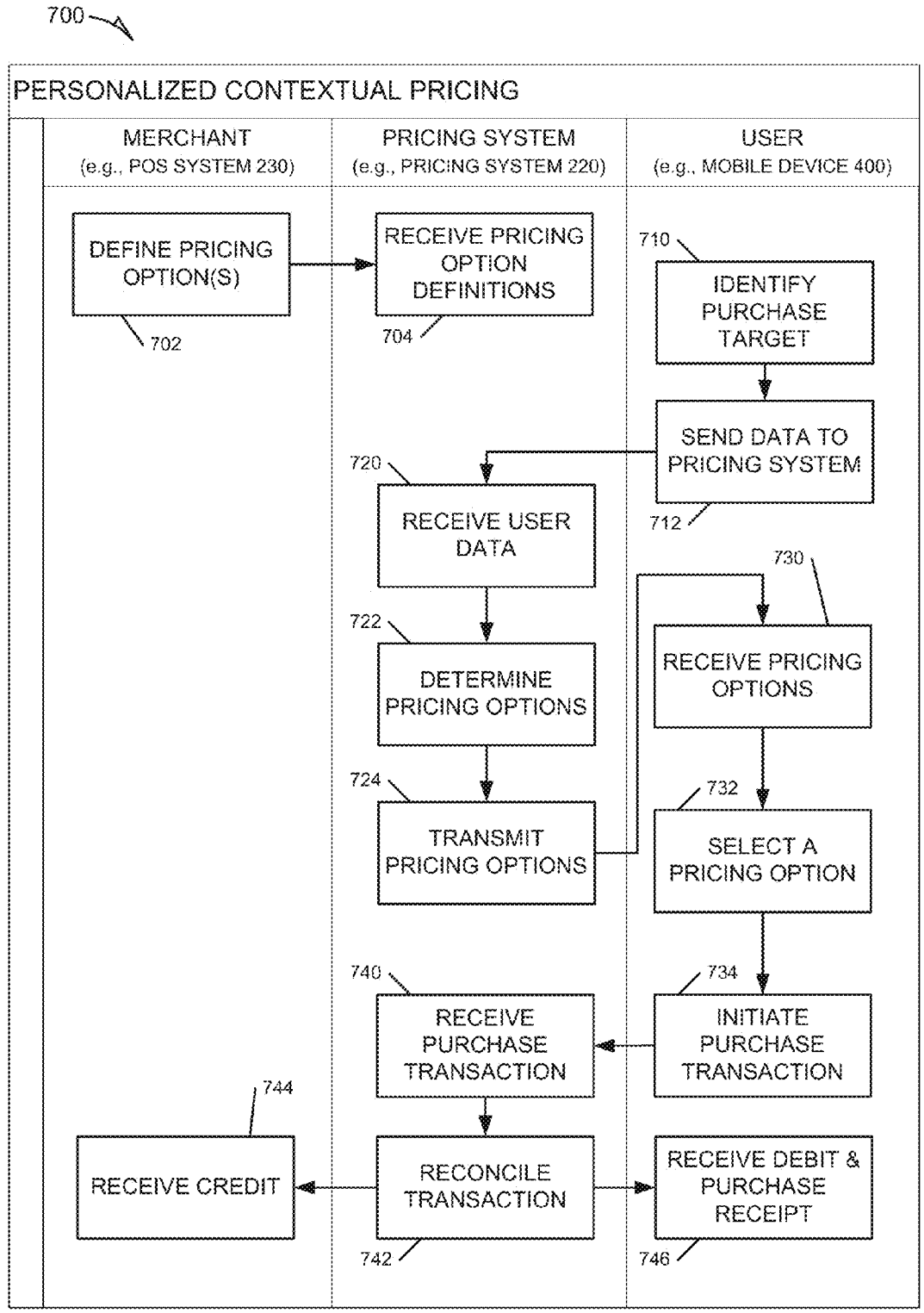
FIG. 7 is a swim-lane chart illustrating a method for providing dynamic personalized contextual pricing, according to an example embodiment.
Figure 8:
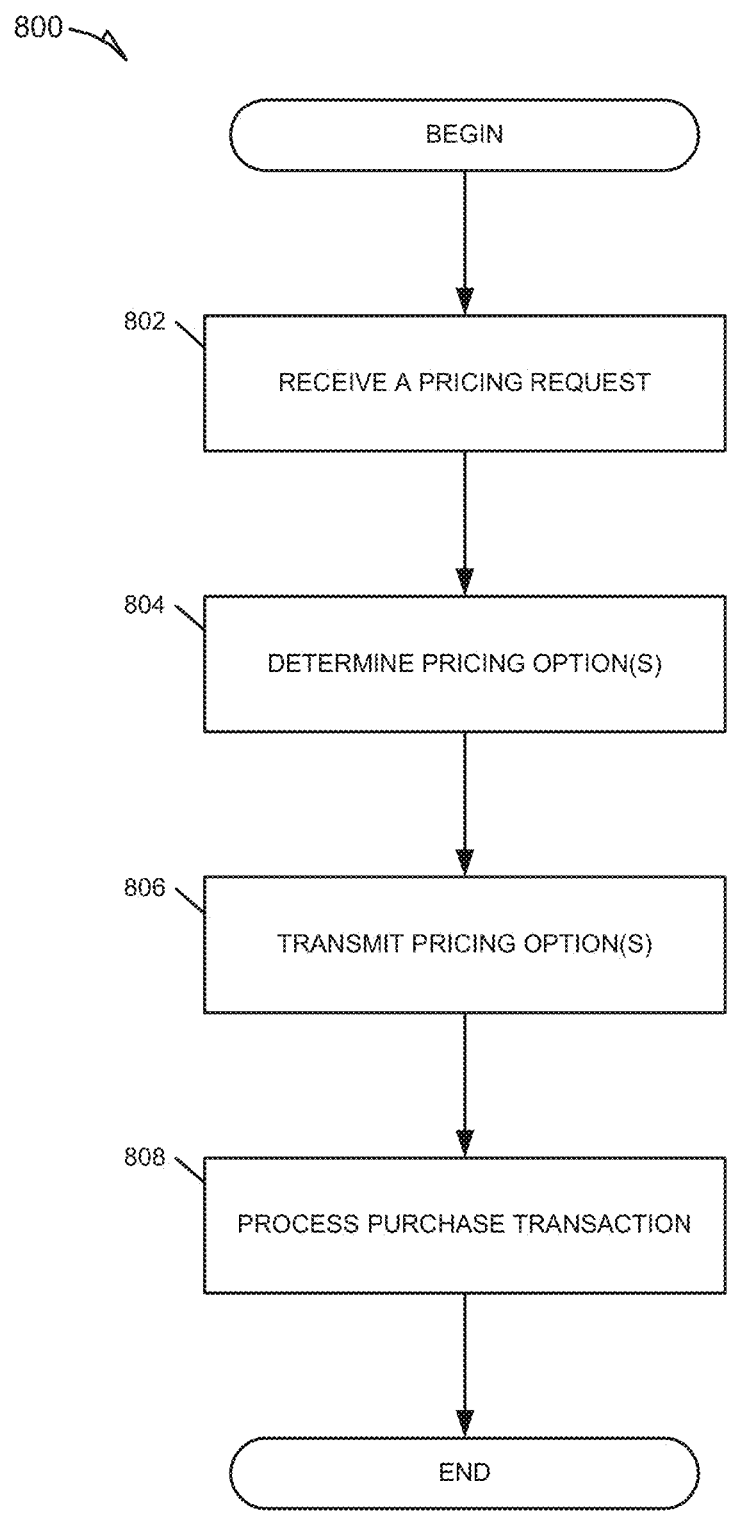
FIG. 8 is a flowchart illustrating a method for processing a purchase transaction using dynamic pricing, according to an example embodiment.

Additional details regarding the functionality provided by the local pricing modules 532 are detailed in reference to FIGS. 7-8.

Example Methods

FIG. 7 is a swim-lane chart illustrating a method 700 for providing dynamic personalized contextual pricing, according to an example embodiment. In this example, the method 700 can include operations for defining pricing options 702, receiving pricing option definitions 704, identifying purchase target(s) 710, sending data to a pricing system 712, receiving user data 720, determining pricing options 722, transmitting pricing options 724, receiving pricing options 730, selecting a pricing option 732, initiating a purchase transaction 734, receiving a purchase transaction 740, reconciling transaction 742, receiving debit and purchase receipt 744, and receiving credit 746. In this example, the method 700 is divided up according to which participant or system handles each operation. In this example, the merchant (via the POS system 230 or similar systems), the pricing system 220, and a user (via mobile device 400) perform the discussed operations as illustrated within FIG. 7. It should be noted that similar operations could be performed by different, additional, or fewer systems and/or participants.

In an example, the method 700 can begin at 702 with the merchant accessing the pricing system 220 to define pricing options. Pricing options can be defined by the merchant according to rules to define the users to target and under what conditions users should be targeted. For example, a merchant can define a rule that provides a 10% store wide discount to users (shoppers) that have purchased a particular item within the last 30 days. The pricing system 220 can present the pricing option defined by the merchant when a qualifying user enters a retail location operated by the merchant.

In an example, the method 700 continues at 710 with the user identifying a purchase target. In an example, the user can use a mobile device, such as mobile device 400, to indicate a purchase target. In some examples, the mobile device 400 can be configured to automatically initiate a purchase request (identify a purchase target) whenever the user enters a participating retail location. At 712, the method 700 continues with the mobile device 400 sending data, associated with the identified purchase target and the user, to the pricing system 220. At 720, the pricing system 220 can receive the data sent by the user's mobile device 400. At 722, the pricing system 220 can use the received data to determine pricing options to present to the user. In an example, the user may be visiting a local fast food establishment (which may be all that is necessary to identify a purchase target at 710). The pricing system 220 can identify the user's current location, access the user's profile data, and determine what pricing options are available from the merchant. In this example, the fast food establishment may have defined a pricing option to give any user that has made a purchase within the last 30 days a 10% discount and another pricing option that gives a 20% discount on a new sandwich to users who have visited a competitive establishment in the last 7 days. The pricing system 220 can evaluate the available pricing options against the user profile data to determine which of the defined pricing options are applicable. In this example, the user profile data may indicate that the user satisfies both rules. Accordingly, at 724, the pricing system 220 can send both pricing options to the user's mobile device. In another example, the user may not qualify for either of the pricing options, but the merchant can define default pricing options available to all users.

At 730, the user's mobile device 400 can receive the pricing options and display them to the user. At 732, the method 700 can continue with the user, via the mobile device 400, selecting one of the pricing options (e.g., the 20% discount). At 734, the method 700 can continue with the user initiating a purchase transaction based on the dynamic pricing option just selected. In an example, the user can initiate (and complete) the entire transaction with the mobile device 400. For example, the user can use a PayPal® payment system smartphone application (from eBay, of San Jose, Calif.) to handle the payment side of the transaction. In another example, the pricing system 220 can include payment modules 522, integrated into the networked system 502 implementing the pricing system 220, which can provide seamless payment infrastructure to the pricing system 220.

At 740, the method 700 can continue with the pricing system 220 receiving purchase transaction information from the mobile device 400. At 742, the method 700 can continue with the pricing system 220 processing (or reconciling) the transaction. In an example, the payment modules 522 can be invoked to process payment from the user to the merchant. The pricing system 220 can decouple the pricing options from the settlement process, which enable personalized dynamic pricing models to be deployed without requiring any training for local retail employees or reprogramming of POS systems. At 744, the method 700 continues with the user receiving (e.g., via the mobile device 400) notice of a debit associated with the transaction and an electronic receipt for the transaction. Finally, at 746, the method 700 can conclude with the merchant receiving, at the POS system 230, payment (e.g., credit) associated with the transaction. In some examples, the credit received by the merchant may reflect a deduction of fees associated with use of the pricing system 220.

FIG. 8 is a flowchart illustrating a method 800 for processing a purchase transaction using dynamic personalized pricing, according to an example embodiment. In an example embodiment, the method 800 begins at 802 with the pricing system 220 receiving a pricing request. The pricing request can be as simple as location data associated with the physical location of a user or the pricing request can involve a specific product or service. For example, a dynamic pricing application running on a user's mobile device, such as mobile device 400, can be configured to send a pricing request each time the user enters a retail location. In another example, the dynamic pricing application can be integrated with a bar code scanning capability and the pricing request can be initiated when the user scans a particular product.

At 804, the method 800 continues with the pricing system 220 determining available pricing options based on the pricing request received from the user. Available pricing options can be determined based on location information, user profile data, external events, inventory levels, time of day, or any criteria that may be available to the pricing system 220.

At 806, the method 800 continues with the pricing system 220 transmitting the available pricing options to the user's mobile device. The method 800 can conclude at 808, with the pricing system 220 processing a purchase transaction between the user and a merchant according to one of the available (pricing options. In an example, the pricing system 220 can communicate with the merchant's POS system, such as POS system 230, to provide a retail employee with an indication that the purchase transaction has been processed, reconciled, and/or completed. Additionally, the pricing system 220 can communicate with (or be integrated into) a payment system, such as the PayPal® payment system, to receive value from the user in satisfaction of the purchase transaction. In an example, the pricing system 220 can include a virtual wallet system that allows users to aggregate payment methods, coupons, and stored value accounts for use in a wide variety of transactions.

Figure 9:
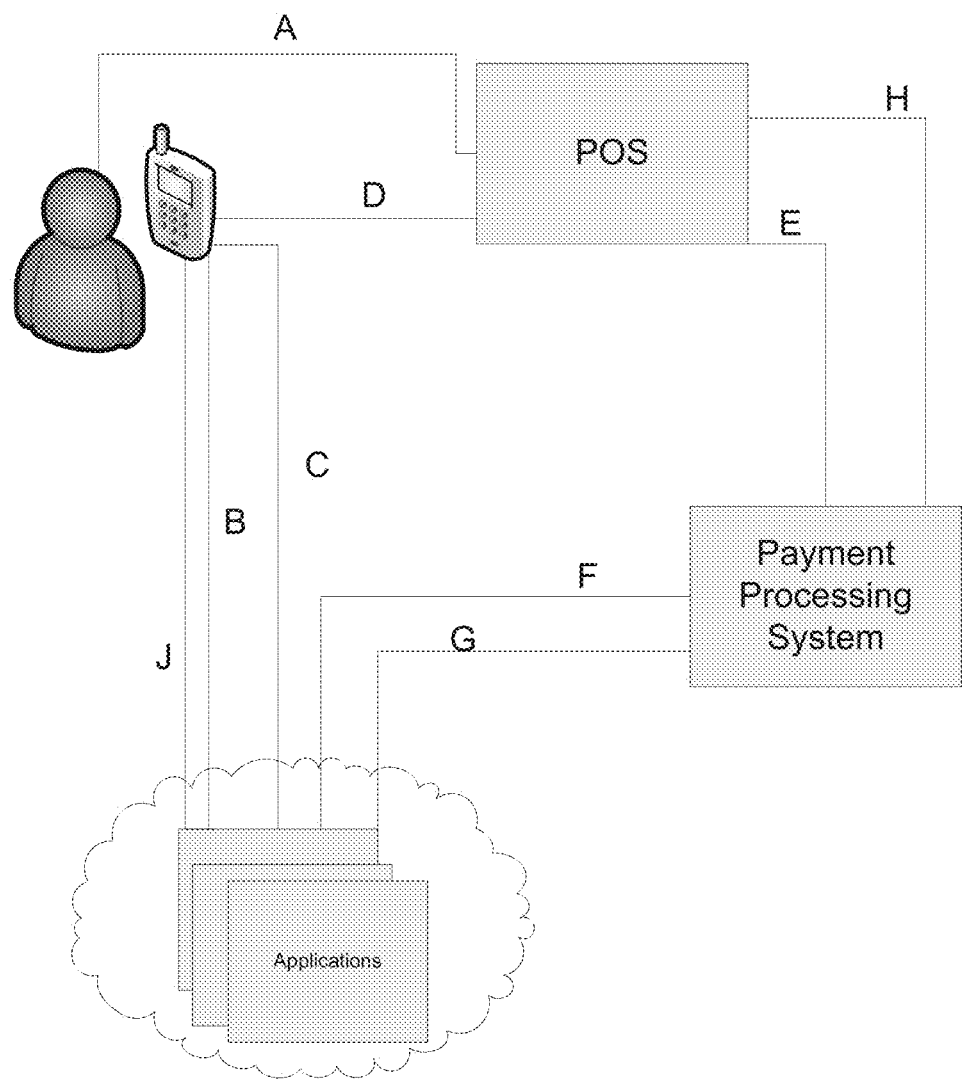
FIG. 9 is a block diagram depicting an illustrative example of location-based personalized pricing and transaction processing according to an example embodiment.

FIG. 9 depicts an illustrative example of a purchase transaction using location-based personalized pricing, according to an example embodiment. In the illustrative example, at operation A, a consumer with a mobile device is in or near a retail store, restaurant, or other merchant location. At operation B, applications provided by the user's mobile device can present pricing offers to the user related to items of interest. The offers can be targeted and relevant to the user. The applications can execute in, for example, a cloud environment. The applications can communicate with at least one database (not shown) through any known means to obtain user location information, localized pricing strategies, or other information. The applications can be one of a location based service application 340, a location determination application 350, and a pricing application 360. However, the nature of the applications is not limited thereto.

In operation C, the user can choose one of the pricing options. In operation D, the user proceeds to the POS 230 to purchase items of interest. In operation E, the POS 230 logs into or checks into a payment processing system. The payment processing system may be, for example, a PayPal® payment system smartphone application executing on the user's mobile device 400, or payment modules 522 of the pricing system 220. As part of checking into the payment processing system, the POS can provide information including buyer identity information, buyer authentication information, the nature and number of the items of interest, and other relevant information related to the proposed transaction between the user and the POS. In operation F, the payment processing system transmits the transaction information to the applications. The applications respond in operation G with pricing information for the transaction. The pricing information can be determined according to embodiments described above with respect to FIGS. 7 and 8. In operation H, the payment processing system communicates the pricing information and other transaction-related information to the POS so that the transaction can be reconciled and completed.

It will be understood that the merchant operating the POS has outsourced pricing to systems according to example embodiments and no special training or knowledge is required at the POS. The user is able to note the transaction details in operation J and the applications then perform then necessary financial transactions such as, for example, debiting or crediting either or both of the merchant and the user.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, on dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 10:
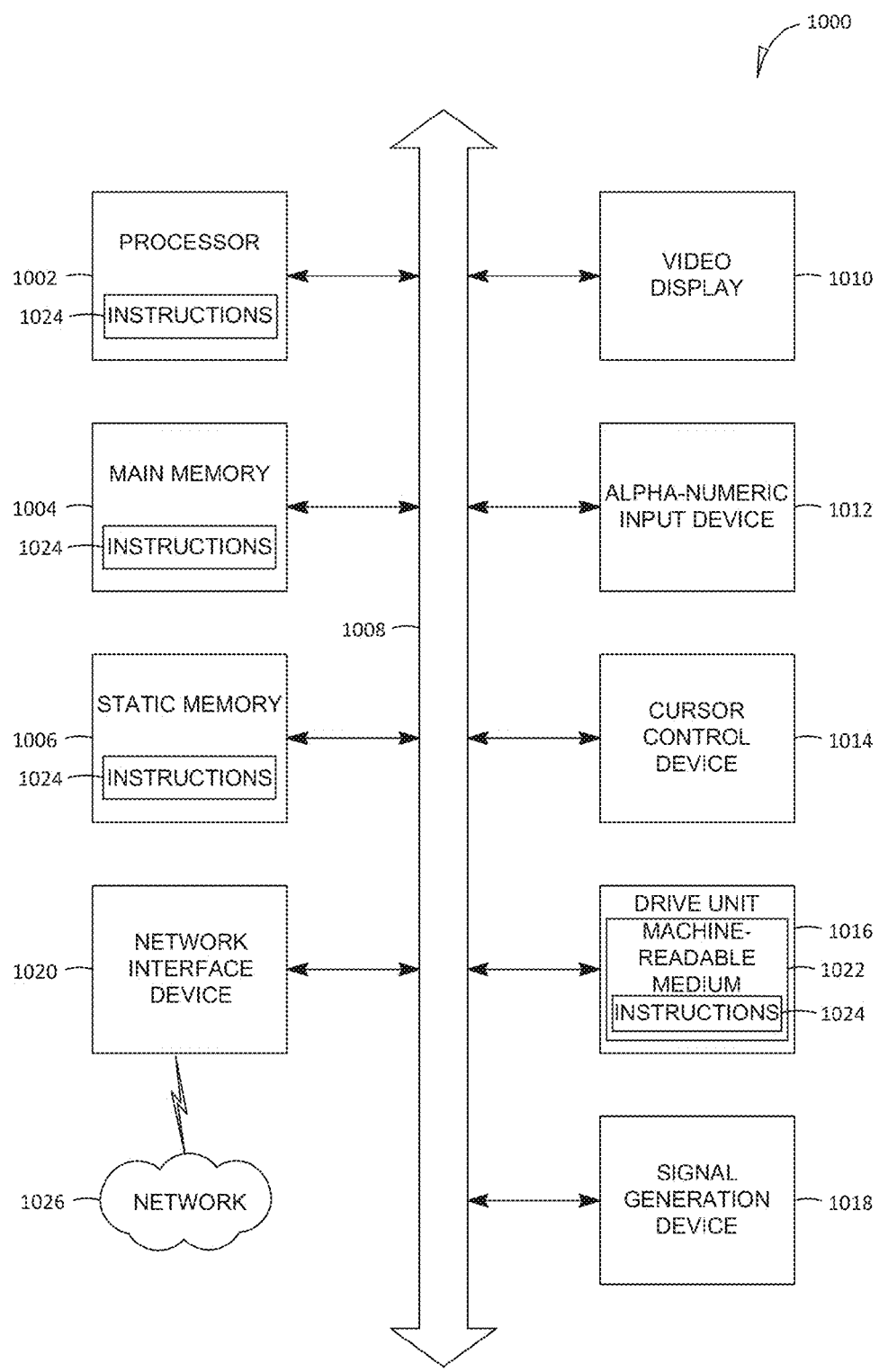
FIG. 10 is a diagrammatic representation of a machine in the example form of a computer system within which a set of instructions for causing the machine to perform any one or more of the methodologies discussed herein ma be executed.

FIG. 10 is a block diagram of machine in the example form of a computer system 1000 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (CPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation device 1014 (e.g., a mouse), a disk drive unit 1016, a signal generation device 1018 (e.g., a speaker) and a network interface device 1020.

Machine-Readable Medium

The disk drive unit 1016 includes a machine-readable medium 1022 on which is stored one or more sets of instructions and data structures (e.g., software) 1024 embodying or used by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall a so be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Thus, a method and system for making contextual recommendations to users on a network-based marketplace have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   receiving, from a client device, at a pricing system, a pricing request that comprises a location identifier that identifies a retail location, and a user identifier associated with a user of the client device;
   accessing a user profile associated with the user identifier in response to the receiving the pricing request at the pricing system, the user profile comprising user profile data that includes a purchase history of the user, and demographics data of the user;
   selecting a pricing option from among a set of pricing structures associated with the retail location based on the user profile data of the user and the pricing request that includes the location identifier that identifies the retail location;
   causing display of a presentation of the pricing option at the client device;
   receiving a selection of the pricing option from the client device; and
   processing a transaction at a point of sale system associated with the retail location based on the pricing option.

2. The method of claim 1, wherein the receiving the pricing request that includes the location identifier includes:
   detecting the client device within the retail location; and
   causing the client device to transmit the pricing request in response to the detecting the client device within the retail location.

3. The method of claim 1, wherein the method further comprises:
   receiving a pricing structure that includes the pricing option from a merchant associated with the retail location; and
   associating the pricing structure with the retail location within a database at the pricing system that stores the set of pricing structures.

4. An apparatus comprising:
   one or more processors; and
   a memory device including instructions that, when executed by the one or more processors, cause the apparatus to perform operations comprising:
   receiving, from a client device, at a pricing system, a pricing request that comprises a location identifier that identifies a retail location, and a user identifier associated with a user of the client device;
   accessing a user profile associated with the user identifier in response to the receiving the pricing request at the pricing system, the user profile comprising user profile data that includes a purchase history of the user, and demographics data of the user;
   selecting a pricing option from among a set of pricing structures associated with the retail location based on the user profile data of the user and the pricing request that includes the location identifier that identifies the retail location;
   causing display of a presentation of the pricing option at the client device;
   receiving a selection of the pricing option from the client device; and
   processing a transaction at a point of sale system associated with the retail location based on the pricing option.

5. The apparatus of claim 4, wherein the receiving the pricing request that includes the location identifier includes:
   detecting the client device within the retail location; and
   causing the client device to transmit the pricing request in response to the detecting the client device within the retail location.

6. A machine-readable storage medium containing instructions that, when executed by a networked system, cause the networked system to perform operations comprising:
   receiving, from a client device, at a pricing system, a pricing request that comprises a location identifier that identifies a retail location, and a user identifier associated with a user of the client device;
   accessing a user profile associated with the user identifier in response to the receiving the pricing request at the pricing system, the user profile comprising user profile data that includes a purchase history of the user, and demographics data of the user;
   selecting a pricing option from among a set of pricing structures associated with the retail location based on the user profile data of the user and the pricing request that includes the location identifier that identifies the retail;
   causing display of a presentation of the pricing option at the client device;
   receiving a selection of the pricing option from the client device; and
   processing a transaction at a point of sale system associated with the retail location based on the pricing option.

7. The machine-readable storage medium of claim 6, wherein the receiving the pricing request that includes the location identifier includes:
   detecting the client device within the retail location; and
   causing the client device to transmit the pricing request in response to the detecting the client device within the retail location.

8. The machine-readable storage medium of claim 6, wherein the instructions cause the networked system to perform operations further comprising:

receiving a pricing structure that includes the pricing option from a merchant associated with the retail location; and associating the pricing structure with the retail location within a database at the pricing system that stores the set of pricing structures.

\* \* \* \* \*

UNITED STATES PATENT AND TRADEMARK OFFICE
CERTIFICATE OF CORRECTION

PATENT NO. : 10,319,010 B2
APPLICATION NO. : 13/572433
DATED : June 11, 2019
INVENTOR(S) : Ivan Mitrovic Page 1 of 1

It is certified that error appears in the above-identified patent and that said Letters Patent is hereby corrected as shown below:

In the Claims

In Column 16, Line 54, in Claim 6, delete "retail;" and insert -- retail location; --, therefor.

Signed and Sealed this
Twenty-first Day of July, 2020

Andrei Iancu
*Director of the United States Patent and Trademark Office*